United States Patent
Niemi

(10) Patent No.: US 8,893,534 B1
(45) Date of Patent: Nov. 25, 2014

(54) YARD HYDRANT LOCKING COLLAR

(71) Applicant: Carl H. Niemi, Nokomis, IL (US)

(72) Inventor: Carl H. Niemi, Nokomis, IL (US)

(*) Notice: Subject to any disclaimer, the term of this patent is extended or adjusted under 35 U.S.C. 154(b) by 0 days.

(21) Appl. No.: 14/080,475

(22) Filed: Nov. 14, 2013

(51) Int. Cl.
F16K 35/00 (2006.01)
E05B 17/00 (2006.01)

(52) U.S. Cl.
CPC .................................. E05B 17/00 (2013.01)
USPC .......... 70/14; 70/18; 70/177; 70/180; 70/203; 70/212; 137/383

(58) Field of Classification Search
USPC ............... 70/2, 14, 18, 19, 58, 175–180, 200, 70/203, 212; 137/383, 384, 384.2, 385; 251/89, 90, 95, 101, 111
See application file for complete search history.

(56) References Cited

U.S. PATENT DOCUMENTS

| | | | | | |
|---|---|---|---|---|---|
| 852,303 | A | * | 4/1907 | Thompson | 70/180 |
| 1,067,549 | A | * | 7/1913 | Quigley | 70/177 |
| 1,099,077 | A | * | 6/1914 | Wray | 70/180 |
| 1,295,689 | A | * | 2/1919 | Byors | 70/212 |
| 1,362,377 | A | * | 12/1920 | Weidner | 70/203 |
| 1,432,621 | A | * | 10/1922 | Rath | 70/180 |
| 1,620,051 | A | * | 3/1927 | Zito | 70/178 |
| 1,656,686 | A | * | 1/1928 | Tjepkes | 70/180 |
| 2,305,438 | A | * | 12/1942 | Michaels | 137/385 |
| 3,532,111 | A | * | 10/1970 | Gaglio et al. | 137/385 |
| 4,956,982 | A | * | 9/1990 | Valley | 70/59 |
| 5,070,712 | A | * | 12/1991 | Fox | 70/18 |
| D339,057 | S | * | 9/1993 | Lofland | D8/343 |
| 5,394,715 | A | * | 3/1995 | Guerette | 70/177 |
| 6,092,402 | A | * | 7/2000 | Porcelli et al. | 70/18 |
| 6,976,695 | B1 | * | 12/2005 | Smith, III | 280/507 |
| 8,074,960 | B2 | * | 12/2011 | Milbeck et al. | 251/93 |
| 8,353,309 | B1 | * | 1/2013 | Embry et al. | 137/385 |
| 2006/0107707 | A1 | * | 5/2006 | Vaughn et al. | 70/18 |

* cited by examiner

Primary Examiner — Lloyd Gall
(74) Attorney, Agent, or Firm — Don W. Weber

(57) ABSTRACT

A yard hydrant locking collar has two C-shaped steel hardened plates connected together at one end by a rivet. The rivet acts like a hinge and allows the top and bottom plates to swivel open and closed. The other end of each top and bottom plates has a locking hole. A one inch tapered slot is cut into the top plate near the locking hole. The top and bottom plates are rotated so the collar fits around the hydrant pipe. The locking holes and slot are positioned near the hydrant locking hole and the collar locking holes are aligned. A padlock is opened and tilted away from the pipe and the free arm of the padlock is placed through the locking hole of the hydrant handle and positioned over the locking holes of the collar. The padlock is then tilted back towards the pipe. The tapered slot allows the padlock to move towards the pipe so that the free end of the padlock can move through the locking holes. Once the free end of the padlock passes through the collar locking holes, the padlock can be raised and locked. The locking collar and hydrant handle are thus locked together to prohibit movement of the handle.

3 Claims, 7 Drawing Sheets

YARD HYDRANT LOCKING COLLAR

BACKGROUND OF THE INVENTION

Outdoor yard hydrants were developed for residential, commercial and agricultural uses. Water pipes are usually positioned vertically to the ground. The pipe is capped off with a hydrant head. The hydrant head containing the water valve is usually operated by lifting a handle and pulling it away from the pipe to discharge the water. These hydrants are modeled after hand pumps from a prior era.

Outdoor hydrants are very vulnerable to vandalism. According to most manufacturers, a chain and padlock is the most common method of securing and locking the hydrant handle to the water pipe. The end of the handle has a locking hole. One places a chain around the pipe and then positions the lock through the locking hole on the handle, thus preventing anyone from raising the handle away from the pipe and opening the water valve. While a seven-sixteenths hardened steel lock cannot be easily cut, the chain used to complete the prior art locking mechanism is quite vulnerable to defeat by simple bolt cutters or hacksaws. It is an object of this invention to replace the easily overcome hydrant chain with a steel, hardened locking collar.

Various patented attempts have been made to secure yard hydrants from vandalism. One such device was disclosed in the 2011 United States Patent issued to Milbeck, U.S. Pat. No. 8,074,960. Milbeck describes a method of restricting access to a water valve securing a locking cap over the valve. Milbeck, FIG. 2, shows an upper cap with a locking hole and a lower ring with a locking hole. Milbeck is a complete locking cap and is not designed nor does it teach a structure for a hydrant valve having a locking hole in the end of the handle.

Another cap-type locking mechanism is found in the 2013 U.S. Pat. No. 8,353,309 issued to Embry. Embry discloses a locking device with a flip top lid hingedly connected to the base of the locking device. The entire Embry locking cap is secured over the valve. Embry does not utilize the locking hole located at the end of a yard hydrant as does the instant invention. It is an object of this invention to utilize the existing structure of a yard hydrant and to provide a structure to lock the hydrant handle in place.

The instant device accommodates a standard outside pipe diameter of approximately one and five-eighths inches. However, simple modifications to the size of the collar allow a user to accommodate pipes of any outside diameter, large or small. It is a still further object of this invention to provide a locking collar for a hydrant that will accommodate any size pipe.

BRIEF DESCRIPTION OF THE INVENTION

A yard hydrant locking collar is presented that has two mirror-image top and bottom C-shaped plates made of hardened steel. The top and bottom plates are hinged at one end by a pivot pin. The other end of each of the C-shaped plates has a locking hole adapted to receive the free end of a hardened steel long shaft lock. The upper plate also has a one inch long tapered slot cut into it. The tapered slot is positioned near the locking hole the same distance that separates the free and attached shafts of the lock.

To use the locking collar, one simply opens the plates at the hinge and positions the top and bottom plates around the vertical water pipe. The collar is then closed around the pipe and the top and bottom locking holes are aligned. The padlock is tilted away from the pipe and the free end of the padlock is placed through the locking hole on the hydrant handle and positioned over the locking holes. The padlock is then tilted towards the pipe. The attached end of the padlock is able to move towards the pipe because the attached shaft fits into the slot of the top plate. Once the end of the padlock protrudes through the two locking holes, the padlock may be raised to lock the padlock in place. This also locks the hydrant handle and the top and bottom plates together such that the handle may not be lifted.

BRIEF DESCRIPTION OF THE DRAWING FIGURES

DETAILED DESCRIPTION OF THE INVENTION

Figure 1:
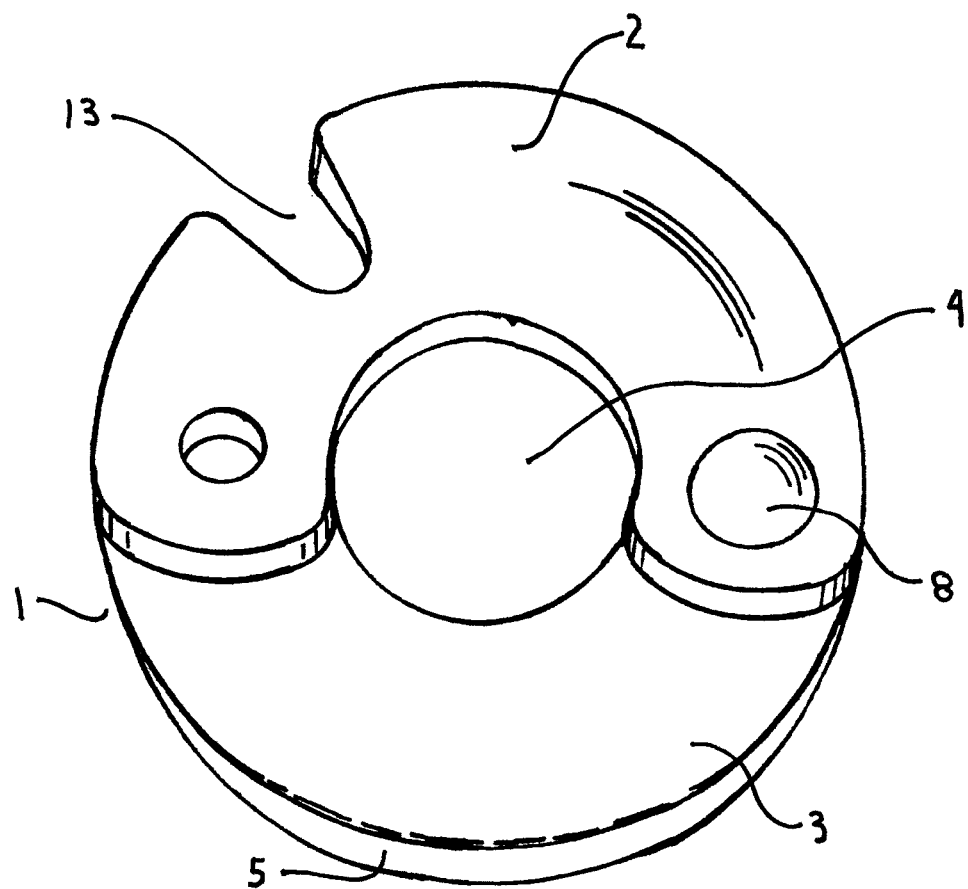
FIG. 1 is a top perspective view of the top and bottom plates of the device in a closed position.

A yard hydrant locking device 1 comprises two essentially C-shaped crescents sections or plates. Top 2 and bottom 3 C-shaped crescents each have an essentially semi-circular outer perimeter and an essentially semi-circular inner perimeter as best shown on FIGS. 1 and 2. The upper 2 and lower 3 crescents pivot about the pivot pin 8 to form an inner hydrant pipe receiving hole 4 when the top and bottom crescents are closed and locked.

The diameter of the inner hydrant pipe hole 4 is approximately one and three-fourths inches in the preferred embodiment and is designed to receive hydrant pipes of that dimension. The inner hydrant pipe hole 4 can vary to accommodate other sized pipes while still keeping within the spirit and disclosure of this invention. The upper 2 and lower 3 crescent shaped plates have a width W, shown as number 6 on Drawing FIG. 2. The radius of pipe hole 4 is approximately seven-eighths inches. The total diameter of the connected plates from the center is approximately four and one-half inches in the preferred embodiment. The thickness 5 of the upper 2 and lower 3 sections is approximately one-fourth inch. The upper and lower crescent shaped plates are preferably made of strong plate steel.

Figure 2:
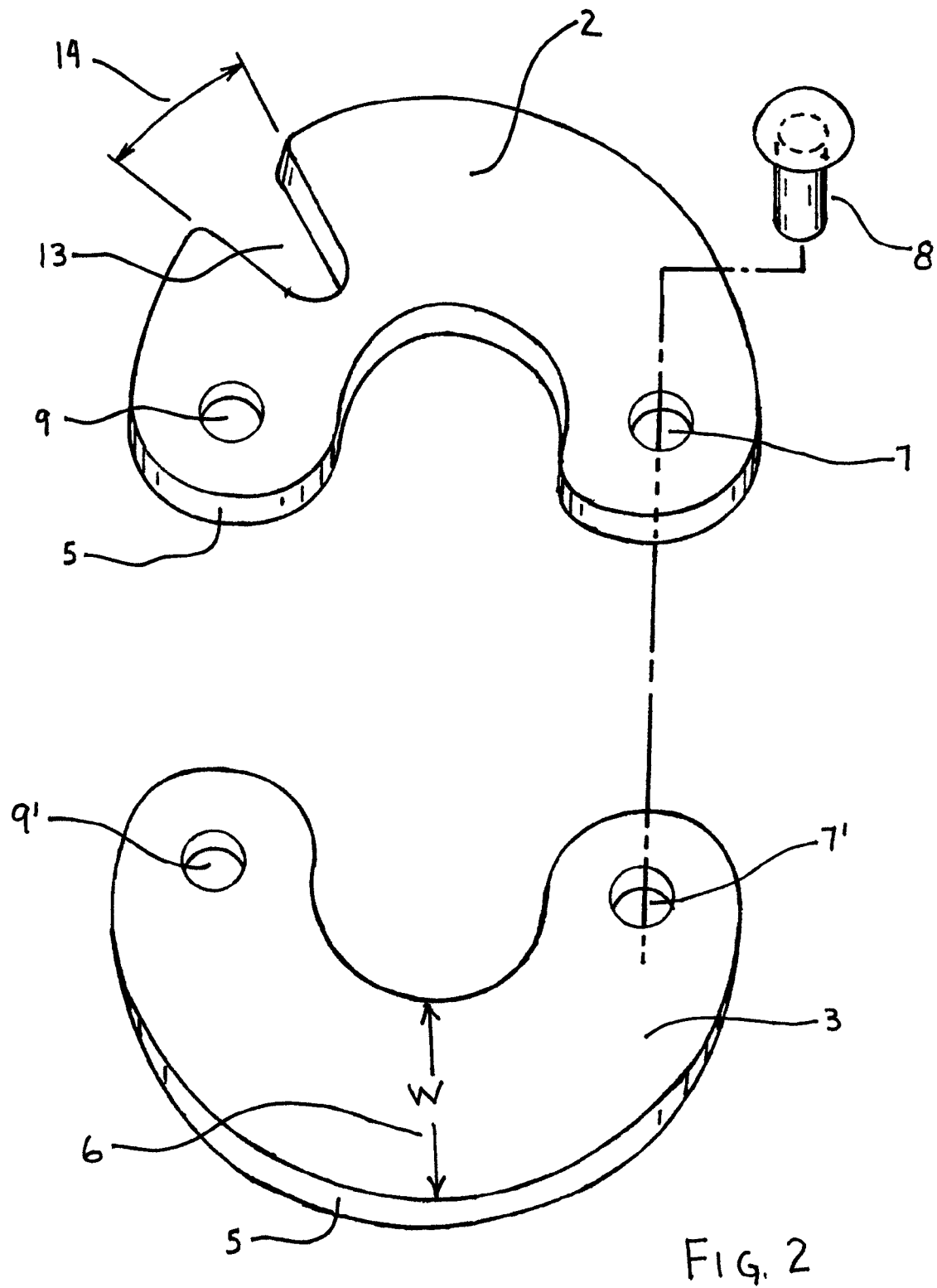
FIG. 2 is a top, exploded perspective view of the top and bottom plates and rivet.
Figure 3:
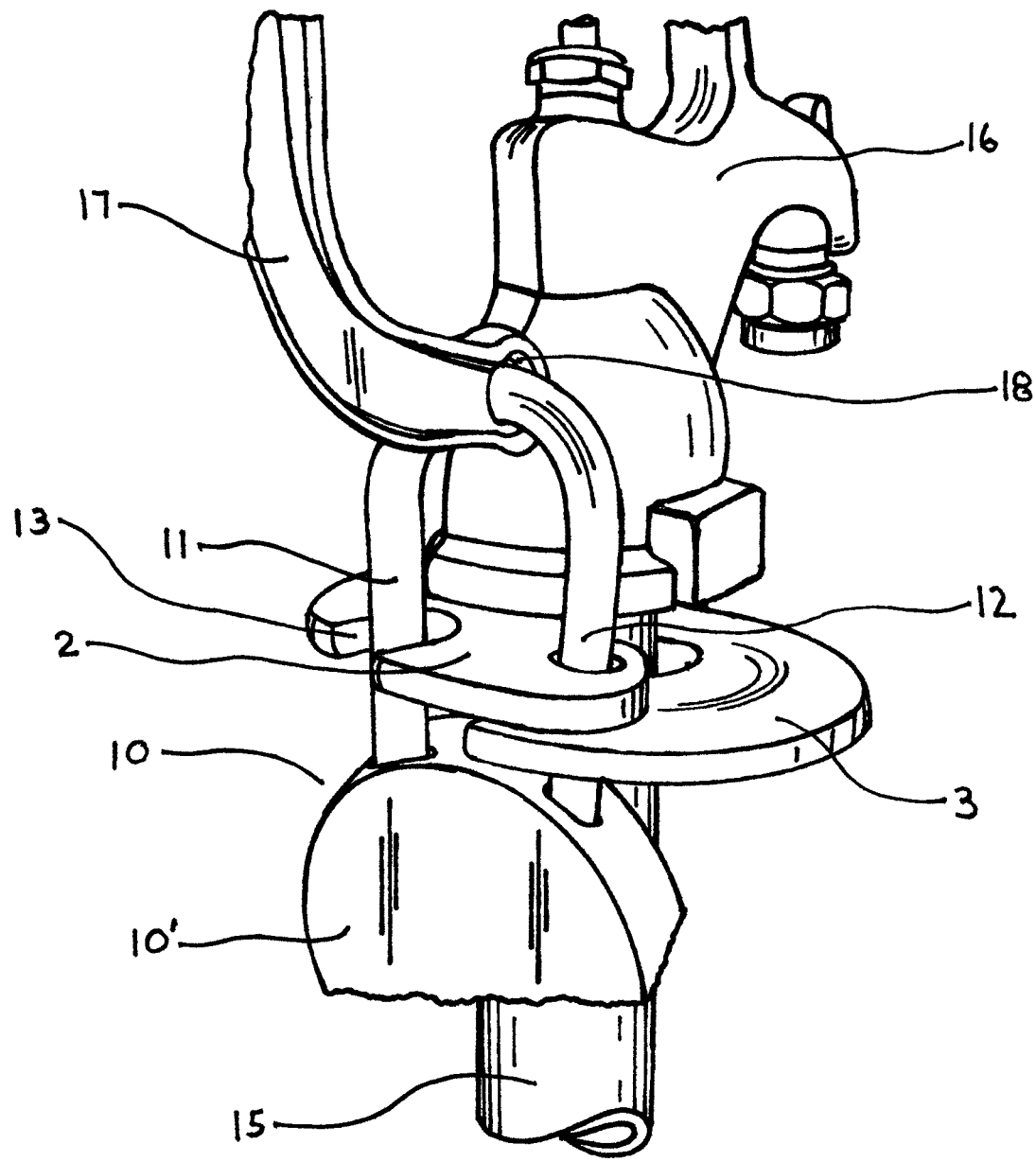
FIG. 3 is a perspective view of the locking collar positioned around a yard hydrant with the lock in place and the hydrant handle secured.

The top and bottom sections or plates are pivotally connected at a pivot hole. The top plate has a pivot hole 7 at its pivot end while the bottom plate has a corresponding pivot hole 7' at its pivot end, as best shown in FIG. 2. A pivot pin 8 (a rivet in the preferred embodiment) pivotally connects upper 2 and lower 3 plates at pivot ends through pivot pin holes 7 and 7'. Pivot holes 7 and 7' are preferably one-half inch diameter holes and accommodate a seven-sixteenths inch rivet.

Each plate has a locking hole at the other, locking end of the upper and lower plates. Upper plate 2 has a lock arm hole 9 at its locking end and lower plate 3 has a lock arm hole 9' at its locking end. These corresponding lock arm holes 9 and 9' are adapted to receive the free end of a lock 10.

Lock 10 is preferably a long shaft padlock wherein the diameter of each arm of the padlock is seven-sixteenths inch. This padlock 10 should be made of hardened steel. The padlock 10 is of a standard shape and operates as is commonly known but has a long shaft. The padlock has a body 10' and a U-shape with two essentially vertical arms connected at the "U". A first vertical attached arm 11 is permanently attached to the padlock body 10'. The body of the padlock swivels about the attached arm 11 such that the opposite free arm 12 may be moved to operate freely of the body. These attached 11 and free 12 arms are best shown on FIGS. 4, 5 and 6. The operation of the lock and the relationships of the attached and the free arms will be explained later.

An essential and important part of this invention is the top plate tapered groove 13 as best shown on FIGS. 1 and 2. Top plate 2 has a tapered groove 13 cut therefrom. The lower edge of the tapered groove 13 is approximately one inch from the outer circumference of the top plate locking hole 9 as shown. The tapered groove is near the locking hole of the upper plate and is located between the locking hole and the pivot hole. The groove is approximately one inch in length measured from the outer edge of the upper plate towards the center of the collar and approximately three-fourths of an inch wide 14 at the outer edge of the upper plate.

The purpose of the groove is to receive the attached arm 11 of lock 10 when locking the hydrant. Groove 13 is spaced apart from locking holes 9 and 9' approximately the same distance as separates the attached 11 and free 12 arms of the lock. Groove 13 does not overlap bottom plate 3 when the two plates are closed upon the pipe. The exact dimensions of groove 13 are described herein for purpose of illustration only and are not meant to be a limitation on the invention. Grooves of varying dimensions to accommodate varying size locks are still within the spirit and disclosure of the invention.

Turning now to FIGS. 4-7, the operation and utility of the invention is shown. The locking collar 1 is opened at the pivot pin 8 and upper 2 and lower 3 plates are placed around a yard hydrant 15 below the hydrant head 16 and near the locking hole 18 of hydrant handle 17. The centers of the locking holes 9 and 9' are then lined up such that the holes correspond.

Figure 4:
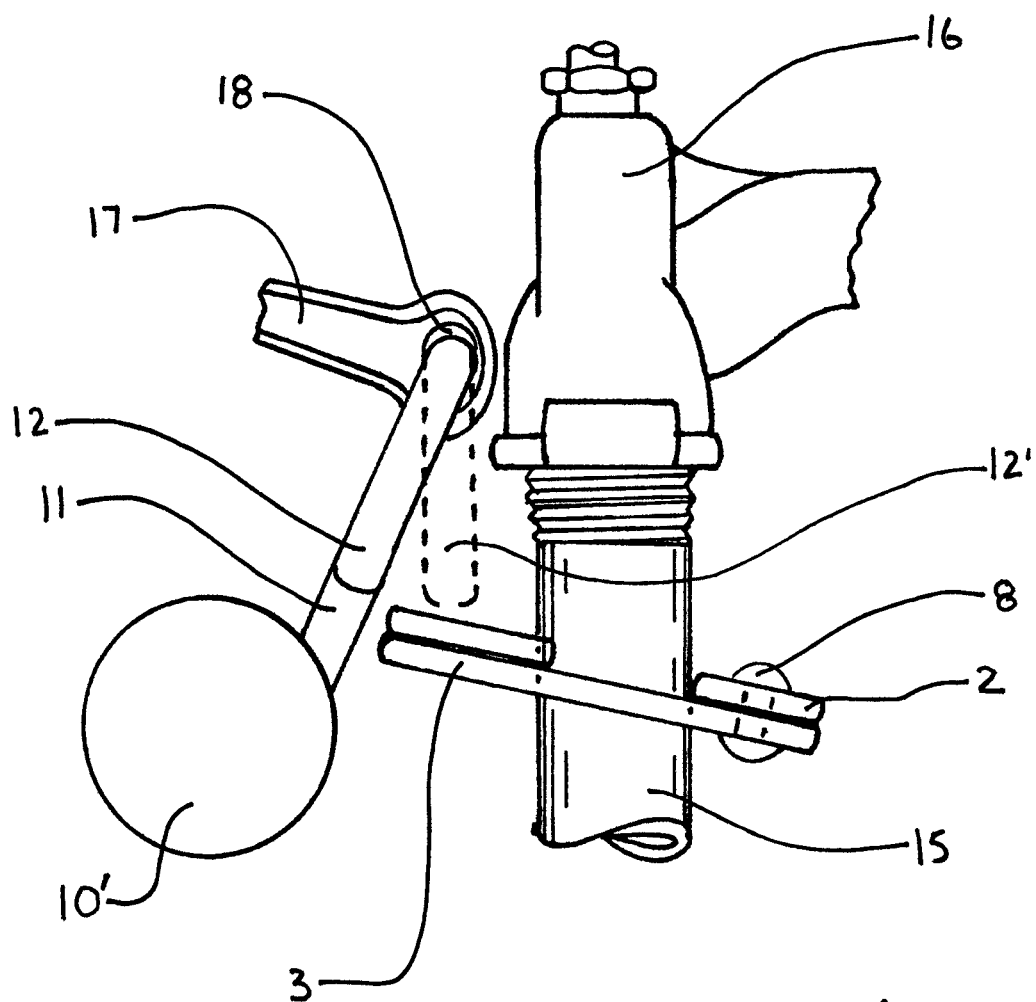
FIG. 4 is a partial side view of the locking collar with the lock tilted away from the hydrant in its initial position prior to the lock being inserted through the locking holes.

At the very end of the hydrant handle 17 is a hydrant handle locking hole 18. The lock 10 is unlocked and the lock body 10' is lowered and rotated so that the body 10' is perpendicular to the U-shaped arms as shown in FIG. 4. The lock is tilted away from the hydrant pipe 15. The locking collar is positioned such that the locking holes and slot are positioned near the locking hole of the hydrant handle. The free arm 12 of the lock shaft is laced through the locking hole 18 of the hydrant arm 17. At this point, the lock body 10' is turned perpendicular to the U-shaped arms 11 and 12 as best shown in FIG. 4. Once the free shaft arm is located above the locking holes 9 and 9' the entire lock 10 is tilted back towards the pipe 15. The free arm (shown as 12' at this point) of the lock is then positioned above the centered locking holes 9 and 9'.

Depending on the looseness of the locking collar around the pipe, the size diameter of the lock arms, the exact size of the faucet hole, the distance between the faucet handle and pipe and other factors, the exact method of locking the collar, lock and handle together may vary. For example, it may be advisable in some instances to have the body 10' of the lock turned parallel to the shaft arms or at varying degrees of rotation. However, the structure of the device does not change and the general instructions on how to use the device are similar to that disclosed above.

Figure 5:
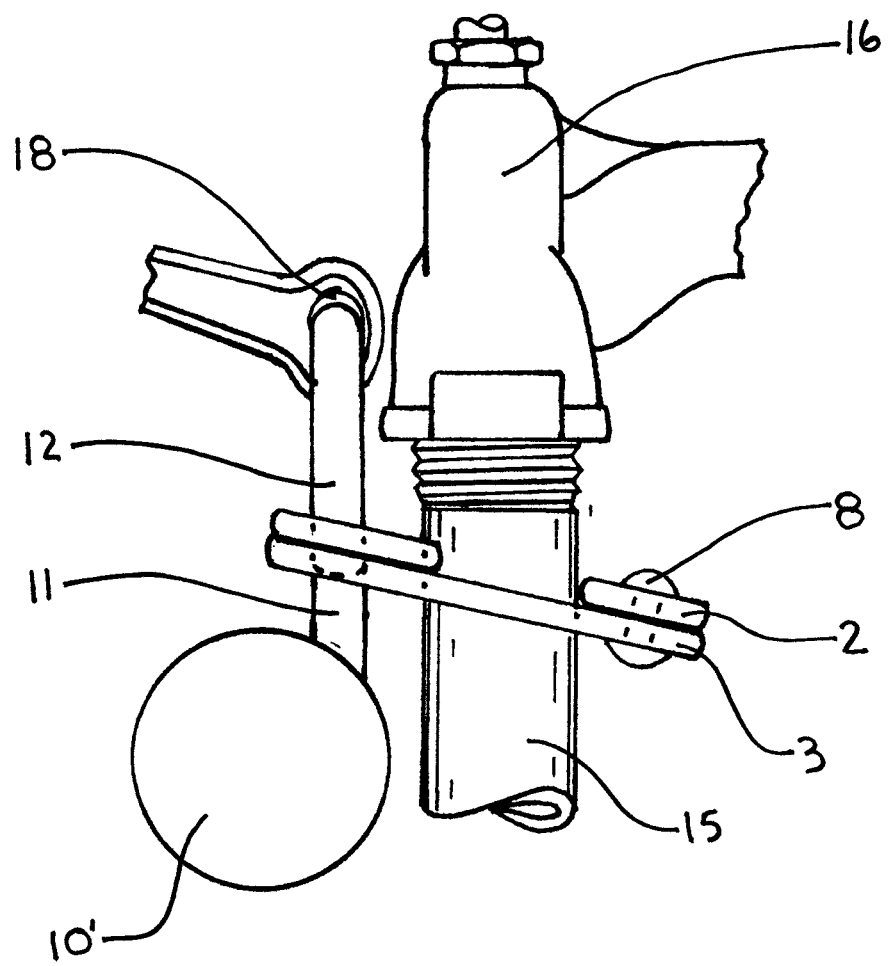
FIG. 5 is a view similar to FIG. 4 with the free arm of the lock just penetrating the locking holes of the upper and lower plates.
Figure 6:
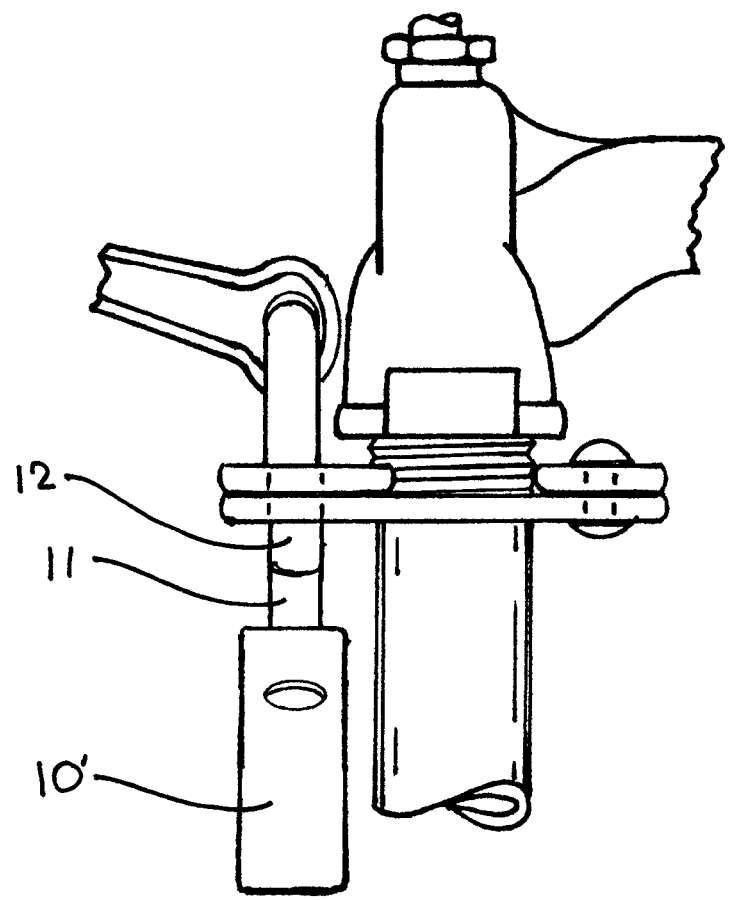
FIG. 6 is a view similar to FIGS. 4 and 5 with the lock in position to be locked but with the lock body 10' lowered and not secured.
Figure 7:
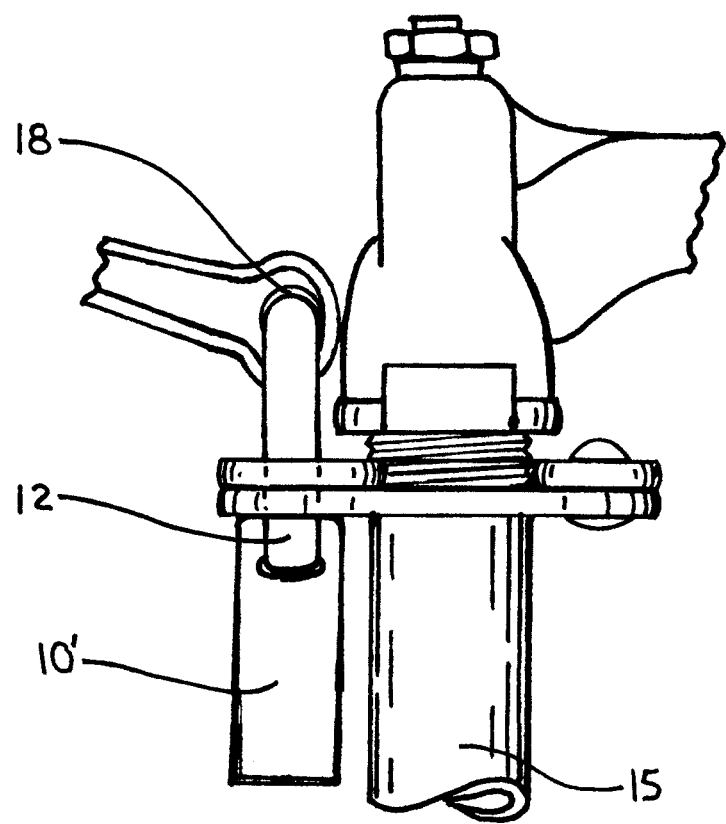
FIG. 7 is a side view similar to FIGS. 4, 5 and 6 with the lock now secured and the hydrant handle in its locked position.

As best shown in FIG. 5, the free arm 12 is then placed through the plate locking holes 9 and 9' as the lock body 10' is moved towards the pipe 15. The lock body 10' is still perpendicular to the U-shaped arms 11 and 12. When the free arm 12 of the lock is placed through the locking holes 9 and 9' the lock body 10' is rotated such that the lock body is parallel to the arms 11 and 12, as shown in FIG. 6. The lock body 10' is then raised such that the free arm 12 is inserted into the locking mechanism of the padlock, as shown in FIG. 7. The hydrant arm 17 is thus secured to the hydrant pipe 15 and it is impossible to raise the arm 17 to turn on the water from the hydrant.

As related above, an important feature of this locking collar is the top plate tapered groove 13. Without this tapered groove, the free arm 12 of the lock could not be inserted into the locking holes 9 and 9' because the attached arm 11 of the U-shape, and hence the entire lock would be blocked from moving into position by the outer perimeter of upper plate 2. The groove is essential to the operation of the invention.

Having fully described my invention, I claim:

1. A locking collar for a yard hydrant comprising a pipe, a pipe head, and a pipe handle with a handle locking hole at its end, attached to the pipe head, the locking collar comprising:
   (1) an upper crescent-shaped plate having a pivot end and a locking end, wherein the ends of said plate are rounded and wherein said crescent-shaped plate has an outer circumference diameter and an inner diameter wherein said upper plate has a pivot hole at its pivot end and a locking hole at its locking end, and wherein said upper plate has an upper plate tapered groove, located within said plate and adapted to receive a free arm of a lock, said groove located near the locking end of said plate between said locking and pivot holes wherein a lower edge of said tapered groove is located within said crescent-shaped plate between said outer circumference and said inner diameter;
   (2) a lower crescent-shaped plate having a corresponding pivot end and a corresponding locking end, pivotally connected to said upper plate at said lower plate pivot end by a pivot pin;
   (3) the lock having a U-shaped structure with a free arm and an attached arm;
      whereby said upper and lower plates are positioned around a hydrant pipe and wherein the free arm of a lock is inserted through the locking hole of a hydrant handle and through the locking hole of said upper plate and a locking hole of said lower plate and said handle is locked to said pipe.

2. A locking collar for a yard hydrant as in claim 1, wherein said tapered groove is approximately one inch in length measured from the outer circumference and approximately three-fourths of an inch wide at said outer circumference.

3. A locking collar for a yard hydrant as in claim 1, wherein said tapered groove is spaced apart from said locking holes of said upper and lower plate approximately the same distance as separates the attached and free arms of said lock.

\* \* \* \* \*